US008768530B2

(12) United States Patent
Liang et al.

(10) Patent No.: US 8,768,530 B2
(45) Date of Patent: Jul. 1, 2014

(54) THERMAL ZONE MONITORING IN AN ELECTRONIC DEVICE

(75) Inventors: Frank Faqiu Liang, San Jose, CA (US); Jay S. Nigen, Mountain View, CA (US); Amaury J. Heresztyn, Cupertino, CA (US); Keith Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 982 days.

(21) Appl. No.: 12/861,770

(22) Filed: Aug. 23, 2010

(65) Prior Publication Data

US 2011/0301778 A1 Dec. 8, 2011

Related U.S. Application Data

(60) Provisional application No. 61/351,842, filed on Jun. 4, 2010.

(51) Int. Cl.
*G05D 11/00* (2006.01)
(52) U.S. Cl.
USPC ........... 700/299; 702/132; 318/471; 345/173; 374/100; 374/141; 374/166
(58) Field of Classification Search
USPC ........... 700/299; 702/132; 318/471; 345/173; 374/100, 141, 166
See application file for complete search history.

(56) References Cited

U.S. PATENT DOCUMENTS

| 7,520,669 B2 * | 4/2009 | Yazawa et al. ................ 374/141 |
| 2005/0221791 A1 | 10/2005 | Angelhag |
| 2006/0135139 A1 | 6/2006 | Cheng et al. |
| 2009/0195497 A1 | 8/2009 | Fitzgerald et al. |
| 2010/0042827 A1 | 2/2010 | Pratt et al. |
| 2010/0048256 A1 | 2/2010 | Huppi et al. |
| 2010/0201626 A1 * | 8/2010 | Krah et al. .................... 345/163 |

FOREIGN PATENT DOCUMENTS

JP          2001352395        12/2001

OTHER PUBLICATIONS

Defrin, R., et al., "Interactions between spatial summation, 2-point discrimination and habituation of heat pain", European Journal of Pain, vol. 12, (2008),900-909.
Ho, H., et al., "Thermal Model for Hand-Object Interactions", IEEE Symposium on Haptic Interfaces for Virtual Environment and Teleoperator Systems, (Mar. 25-26, 2006), 461-467.
Jones, Lynette A., et al., "Material Discrimination and Thermal Perception", IEEE Proceedings of the 11th Symposium on Haptic Interfaces for Virtual Environment and Teleoperator Systems (HAPTICS'03), (2003), 8 pages.

(Continued)

*Primary Examiner* — Mohammad Ali
*Assistant Examiner* — Sheela S Rao
(74) *Attorney, Agent, or Firm* — Blakely, Sokoloff, Taylor & Zafman LLP

(57) ABSTRACT

A predefined mathematical relationship that is stored in the memory of a computing system is accessed, wherein the relationship refers to temperatures of a number of points in the system, wherein the points together define a zone. The mathematical relationship yields a representative temperature for the zone. Temperature data from sensors in the system is obtained and applied to thermal models, to estimate the temperatures of at least some of the points that define the zone. The representative temperature for the zone is computed using the estimated temperatures as input to the mathematical relationship. A decision is then made on whether or not to change a power consuming activity limit in the system, based on the computed representative temperature. Other embodiments are also described and claimed.

16 Claims, 4 Drawing Sheets

(56) References Cited

OTHER PUBLICATIONS

Jones, Lynette A., et al., "The Psychophysics of Temperature Perception and Thermal-Interface Design", IEEE Proceedings of the 10th Symposium on Haptic Interfaces for Virtual Environments and Teleoperator Systems (HAPTICS'02), (2002), 6 pages.

Jones, Lynette A., "Thermal Touch", Scholarpedia 4(5), Accessed via Internet: <http://www.scholarpedia.org/article/Thermal_touch> on Jun. 4, 2010, (2009), 4 pages.

Marks, L. E., "Spatial Summation in Relation to the Dynamics of Warmth Sensation", Int. J. Biometeor, vol. 15, No. 2-4, (1971), 106-110.

Yang, Gi-Hun, et al., "Spatial acuity and summation on the hand: The role of thermal cues in material discrimination", Attention, Perception & Psychophysics, vol. 71, No. 1, (2009), 156-163.

Yang, Gi-Hun, et al., "Use of Simulated Thermal Cues for Material Discrimination and Identification with a Multi-Fingered Display", Presence, vol. 17, No. 1, (Feb. 2008), 29-42.

* cited by examiner

THERMAL ZONE MONITORING IN AN ELECTRONIC DEVICE

RELATED APPLICATIONS

This application claims the benefit of the earlier filing date of U.S. provisional application No. 61/351,842 filed Jun. 4, 2010, entitled "Thermal Zone Monitoring in a Mobile Device".

FIELD

One embodiment of the invention relates to a closed loop thermal control process in a portable electronic device having several embedded temperature sensors. Other embodiments are also described.

BACKGROUND

Most electronic products in use today generate heat. If unchecked the heat may result in reduced reliability of the product over time. Accordingly, measuring and controlling the thermal characteristics of a product are important design considerations. To resolve thermal issues, several proactive measures have been developed including reducing the speed at which a constituent processor of the product is running, engaging cooling fans, lowering a cellular network RF transmit power limit, dimming a display, etc. Many computer systems designed today require these proactive measures to provide adequate performance in order to not frustrate the user's experience with the device, under various thermal conditions. Temperature sensors may be embedded or integrated inside the housing of the product, to sense temperature at various locations. Closed loop thermal control or management algorithms may be developed in the factory based on data collected from these temperature sensors while running the device in its various normal operating modes. The algorithms are then stored as thermal control software (part of a thermal control subsystem) in each of the individual production specimens of the device. A processor runs this software during the in-the-field use, monitoring or collecting data from the temperature sensors over time and then analyzing the data and comparing to predetermined constraints, to make decisions on which thermal actions to take in order to effectively manage the thermal behavior of the device so as to maintain or regulate the temperature of a given location within a specified constraint.

Temperature sensors are often embedded within large integrated circuits, which can only be placed at a limited number of locations inside the computer system housing. Also, using a large number of discrete thermal sensors (e.g., thermocouples, thermistors) may in some cases be cost-prohibitive. Temperature sensors may be placed in various places within a computer system such as, for example, on the microprocessor (CPU) die, in the proximity of the CPU die (CPU Prox), on a motherboard, on a hard drive device, on a heat pipe, on a battery, on a track pad, etc. However, very often, a desired spot whose temperature needs to be carefully monitored or regulated in order to not exceed a specified limit may be located at a particular point where it is difficult to put a sensor, such as the bottom face of the case of a laptop computer system or the rear face (back plate) of a smart phone device. These points may be generally referred to as critical points or hotspots. Thermal models may be generated to accurately estimate the "virtual temperature" at these critical points, based on data received from temperature sensors located elsewhere in the device. See, for example, U.S. Patent Application Publication No. 2010/0094582 of Keith Cox, et al., "Method for Estimating Temperature at a Critical Point", assigned to the same assignee as the present application ("Our Earlier Application"). Proactive measures may then be taken by the closed loop thermal control subsystem using this estimated temperature data (together with data from actual temperature sensors and data indicating current power consumption levels by various components in the device), to mitigate the thermal behavior at a critical point, such as turning on a system fan, lowering power supply voltage of a nearby component, and so on.

Thermal control is particularly challenging for a consumer electronic portable electronic device that is held and carried by its user while in operation, such as a cellular telephone, smart phone, digital media player and the like. Such devices are usually small and densely packed so that heat may not be easily dissipated. Furthermore, such devices are frequently in intimate contact with a user's skin so that customer satisfaction concerns arise if the thermal characteristics of the device are not properly managed. As a result, manufacturers of electronic products design the thermal control subsystem to limit the exterior surface temperature to levels that promote user comfort.

SUMMARY

Embodiments of the present invention provide a method for monitoring thermal zones or regions in an electronic device and using that to control the thermal behavior of the device as part of a closed loop thermal control process. In the case of a portable electronic device, the closed loop thermal control process is designed to maintain a desired performance level of the device (e.g., the maximum possible) while avoiding excessive heat levels on the outside surface of an exterior housing of the device that would compromise the user's comfort level while holding the device in her hand. In one embodiment, temperature readings are taken with a number of temperature sensors that are embedded or integrated in the electronic device. A zone is defined by several spaced-apart, distinct points or spots in the device. Some or all of these may be spaced apart or remote from the sensors. In addition, in the case of a portable device, some or all of the points that define the zone may be on the outside surface of the exterior housing of the device, generally within the areas with which the skin of a user of the device would usually be in contact during normal or in-the-field use of the device. The temperature at each of these points may be estimated using a thermal model, with the temperature readings from the sensors as input to the thermal model. A single representative temperature value is then computed for the zone. A zone constraint or threshold is also specified for the representative temperature, where the zone and its constraint may be based on a human user's sensory resolution (e.g., how a human user would feel the heat of the device through her hand that is holding the device). If it is then determined that the computed representative temperature of the zone exceeds the constraint or threshold, then measures are automatically taken to reduce the amount of heat generated in the device. The zone may be defined to have dimensions approximately equal to the touch sensory resolution of a user of the device.

Using the concepts of a zone and a representative temperature for the zone would likely improve system performance, while satisfying the constraints that are based on the customer's sensory resolution. That is because limiting a surface or component operating temperature without accounting for spatial variation and geometric scale could be overly constraining. For example, restricting the performance of a portable device to ensure that a certain critical point does not exceed a stated operating temperature range, where the critical point is really too small for a person (whose skin is in contact with the critical point) to feel sufficient heat therefrom, would detrimentally impact performance with no realized benefit. An embodiment of the invention advantageously uses the concept of a zone (and its associated "zone-specific" constraint), rather than an individual point or spot, to manage the thermal behavior of the device so as to maintain a higher performance level by the device while still providing a pleasant experience for the user whose skin is in contact with the zone during operation of the device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

Figure 1:
FIG. 1 shows a human user holding different types of a computing system, namely multi-function handheld mobile devices such as a smart phone and a handheld tablet-like personal computer.

FIG. 1 shows a human user holding different types of a computing system being in this example a multi-function handheld mobile device referred to here as a personal mobile device 2. In one instance, the mobile device 2 is a smart phone or a multi-function cellular phone with several features typically available in such modern devices, such as a touch screen interface, music and video file recording and playback, digital camera, video games, and wireless-enabled applications such as voiceover Internet protocol telephony, electronic calendar, web browser, and email. In another instance, the mobile device 2 may be a larger, handheld tablet-like computer such as an iPad™ device by Apple Inc. In another instance, the mobile device 2 may be a laptop or notebook computer. Such devices are often used at quite different ambient temperatures, for instance, inside a relatively cooler air conditioned room, and outside under a summer sun. FIG. 1 also shows example target zones on the outside surface of the housing of the device 2, which consist of critical points (or potential hotspots) located on the sides and on the back of the housing where the user is holding the device in his hands. Another possible target zone is a region on a back face of the housing where the user typically holds the device 2 in a telephone handset configuration against her ear, during a call. A functional unit block diagram and some constituent hardware components of the device 2, for example, as found in an iPhone™ device by Apple Inc., is given below in FIG. 4.

Figure 2:
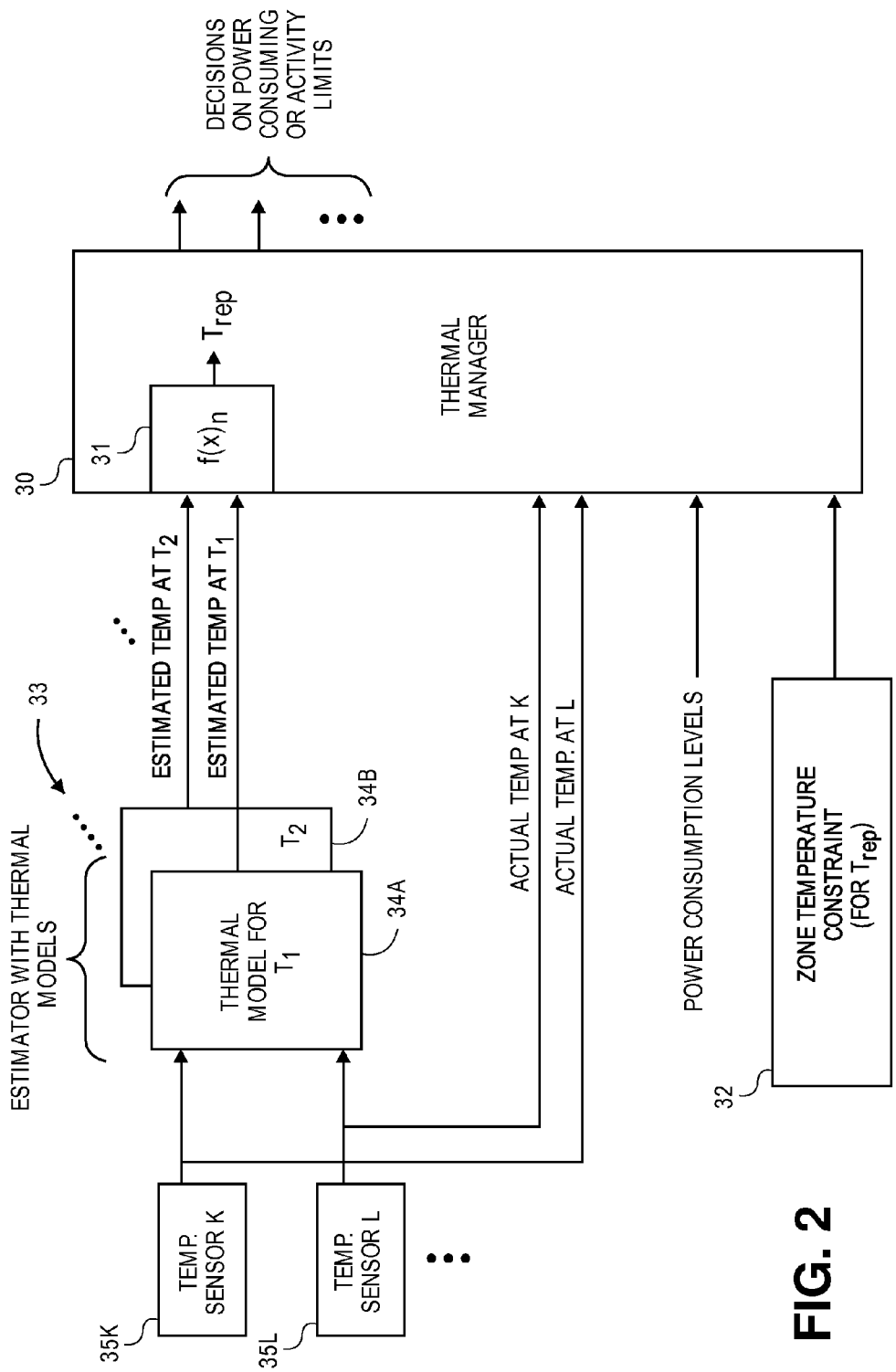
FIG. 2 is a block diagram of some of the elements that may be involved in performing a closed loop thermal management function of the computing system.

Turning now to FIG. 2, a block diagram of some of the elements that may be involved in performing a thermal control process or thermal management function of a computing system is shown. It should be noted that while a mobile device is used to explain the various embodiments of the invention here, the elements in FIG. 2 as well as the algorithms described later for thermal modeling and control can alternatively be implemented in other types of computing systems such as desktop computers, servers, networking devices such as routers and switches, as well as systems on a chip.

A thermal manager 30 makes decisions on whether or not to change one or more power consuming activity limits in the device 2, based on at least one representative temperature, $T_{rep}$, for a target zone or region in the device 2. $T_{rep}$ may be a virtual temperature because there may be no actual temperature sensor at any of the points that define the zone. The thermal manager 30 controls the thermal behavior of the system by, for instance, increasing fan speed or reducing power consumption within one or more components of the system, as a given virtual representative temperature approaches its zone-specific constraint 32. This is done to "regulate" the representative temperature, as part of a closed loop thermal control process conducted by the thermal manager 30.

To provide more sophisticated control of the thermal behavior, additional inputs may be provided to the thermal manager 30, including sensed temperature data obtained using one or more embedded temperature sensors 35, and at least one power consumption level of a particular component in the device 2. As an example, the thermal manager 30 may be receiving a sample every second from a sensor 35 that is in a large microprocessor integrated circuit die of the device 2. There may also be a sample sequence arriving from a sensor that is near a battery charging circuit. At the same time, measurements or estimates of the microprocessor's power consumption level may be received. All of this information may be input to an algorithm in the thermal manager 30 that makes the decisions on whether or not to change any particular power consuming activity limits, in order to maintain a specified constraint 32 for the target zone's representative temperature.

Figure 3A:
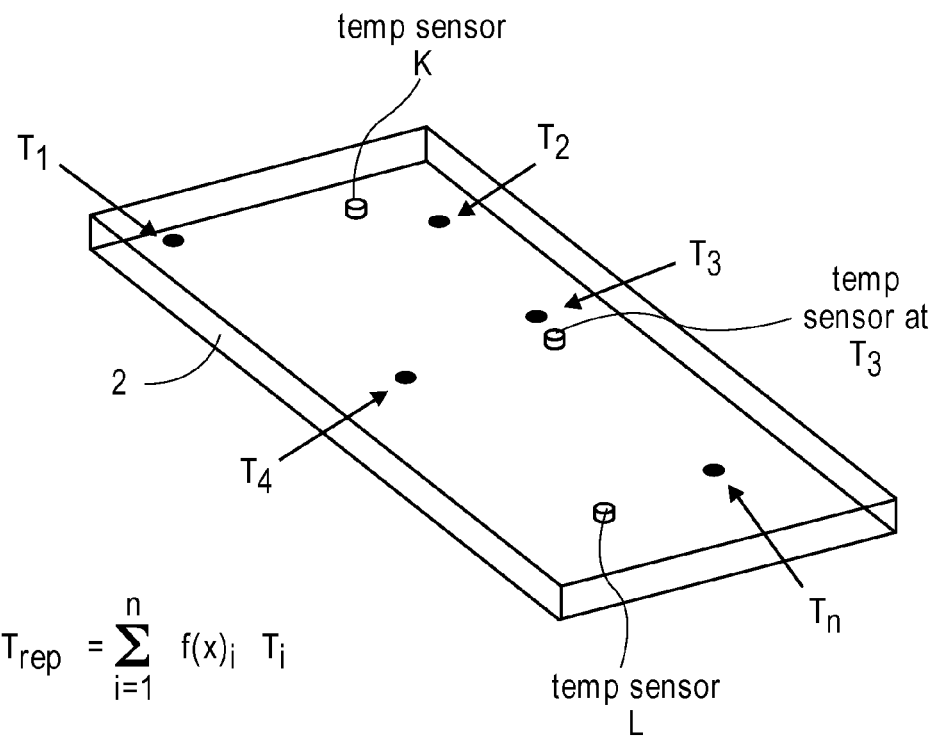
FIG. 3A illustrates a number of selected temperature points or spots in a computing system that define an example zone or region to be monitored.
Figure 3B:
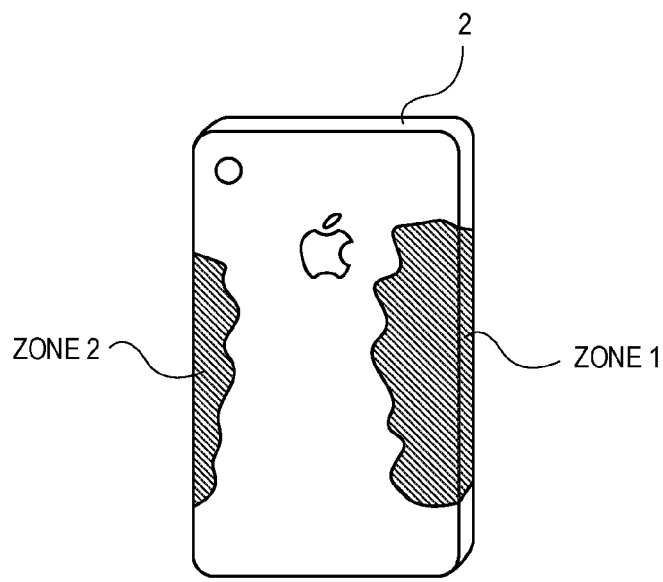
FIG. 3B shows example zones as continuous regions, on the outside surface of the housing of a multi-function handheld mobile device.

The $T_{rep}$ of the target zone is given by a mathematical relationship or operator 31, in this example as a summation of scaled individual or point temperatures $T_i$. Each of these $T_i$ may be a virtual temperature at a critical point selected to match the user's sensory resolution. FIG. 3A shows a group of points labeled $T_1, T_2, \ldots$ that define a zone or region which may be inside and/or on the outside exterior surface of the device. FIG. 3B is an example of the latter, as a continuous region on the exterior surface of a mobile device where the users palm and fingers would typically touch during normal operation of the mobile device. The continuous region may be approximated by a sufficient number of points or spots, which may be determined empirically through experimentation. The temperature $T_i$ of a given spot that has no temperature sensor close by may be computed by an estimator 33, using an individual temperature model 34 for that spot. Note that in the case of FIG. 3B each of the spots selected to define zone 1 or zone 2 (i.e., any defining $T_i$) is actually on the exterior surface of the housing and is therefore one that is not likely to have a temperature sensor that is sufficiently near it to provide an accurate measure of its temperature. If there were such a sensor sufficiently close to that $T_i$, then the temperature of that spot need not be estimated but instead can simply be read from that sensor, e.g., see FIG. 3A, temperature sensor at $T_3$. A temperature sensor 35 may include a thermistor or other suitable component that can respond to changes in temperature, together with any signal conditioning and analog to digital conversion circuitry needed to provide a digital output (suitable for digital signal processing by the estimator 33).

Direct and indirect thermal models may be developed to model temperature in a data processing system and to determine the desired temperature at the critical point, based on the thermal behavior of temperature sensors that may be located in various spots within the data processing system. Direct modeling uses the instantaneous power, ambient temperature, and airflow, whereas indirect modeling requires estimating the critical temperature with the help of the temperature sensors placed in feasible places. The presence of compounding factors like the distribution of the power in the system, inability to measure room temperature accurately, etc., result in a far too complex model, resulting in inaccuracy in the direct modeling case. Additionally, the models developed using direct modeling fail to generalize well from one data processing system to other data processing systems.

With reference again to FIGS. 2 and 3A, an indirect model for a representative temperature $T_{rep}$ of a zone of the device 2 may be calculated as the functional summation of the temperatures at each of the N constituent points $$T_{rep} = \sum_{i=1}^{N} f(x)_i T_i \quad (1)$$

Where $f(x)_i$ is a weighting function for the $i^{th}$ point that may be derived for the particular device 2, and for the particular locations of the points that define the zone.

The representative temperature thus calculated is not necessarily equal to the highest or any specific spot temperature on a larger surface of the electronic device. Studies have shown that a person's ability to sense a specific temperature is limited by the body's sensory resolution. If a hot spot on a larger surface has an area less than the skin's sensory resolution, the person does not sense the absolute temperature of the hot spot, but instead senses an average temperature over an area equal to an area of the skin's sensory resolution. Therefore, defining a limit temperature or constraint for a surface can be challenging if there is a high degree of spatial variation in temperature over the surface. In terms of user comfort, having an extremely small region of a surface exceed a specified temperature limit might not be meaningful if the region is too small for the body to resolve. By judicious selection of the points that define the zone, and selection of their associated weighting functions, the representative temperature will match a user's sensory resolution. The representative temperature may then be employed by control algorithms to satisfy a set of desired operating parameters or constraints.

One such operating parameter or constraint is to insure that $T_{rep}$ for a given zone of the device does not exceed a predefined zone-specific temperature limit. As discussed above, it is possible that a spot (or point) temperature in the zone may, in fact, exceed a predefined maximum temperature but this need not be of concern as long as the temperature perceived by the user, as reflected in $T_{rep}$, which is a result of the user's sensory resolution, does not exceed the zone-specific constraint.

When the representative temperature reaches a threshold value, control algorithms then take one or more appropriate actions to decrease the thermal output of the device so as to regulate the representative temperature. Such actions may include, for example, but are not limited to, turning on a fan to remove heat faster, reducing the clock speed of a processor, dimming a display screen, suspending background or other non-essential operations, etc. More generally, the thermal manager in FIG. 2 is capable of managing the thermal behavior of the device 2 during in-the-field use, that is, normal use by an end user of the device 2. The thermal manager 30, in particular, will adjust how the different parts of the device 2 heat up and/or cool down during normal use, in order to maintain the $T_{rep}$ of a target zone within a set of one or more predefined zone-specific constraints 32 that are also stored in the device 2. Note that similar constraints (for example, a temperature range having a lower threshold and an upper threshold) for different zones defined in the device 2 are likely to be different than each other, not just because the human sensory resolutions associated with each may be different but also the thermal behavior of each zone may be different. For instance, one zone may have many points that are deemed "close" to a particularly power-hungry component of the device 2, while another zone may have only a few points that are close to the same component.

A process for selecting the points of a zone, developing any thermal models 34 needed for any of those points, and selecting the $f(x)_N$ operator 31 that is used to compute $T_{rep}$ for that zone, may be described as follows. This process may take place at the factory where the device 2 is being developed.

$T_1, T_2, \ldots T_N$ are selected to sufficiently fill or define a particular zone of interest (e.g., the points may be spread evenly across the surface of the exterior sides and back plate of a mobile device housing where the user's fingers and palm are most likely to touch, while holding the device during a call for instance or while playing a video game); note that too many points may make the thermal manager's computation task unwieldy during in-the-field use while too few points may not provide enough coverage of the user's sensory resolution in a particular scenario;

for each point of $T_1, T_2, \ldots T_N$ that is not located close enough to an embedded sensor of the device 2, a thermal model is derived that computes a virtual temperature for that point—see below for an example process for deriving a thermal model in the manner described in Our Earlier Application (steady state response separated from transient and then combined);

the f(x) are selected, e.g. an averaging function, although another more complex operator may be used instead;

the zone-specific constraints are selected, e.g. empirically through testing, to provide a sufficiently comfortable experience for a typical user of the device 2;

the performance of the thermal manager with respect to a given zone is then verified to ensure a comfortable user experience on a sample production version of the device 2;

once the performance of the thermal manager for a given zone has been verified, all of the following may be written into the memory of each specimen of the device 2, ready to be deployed for in-the-field operation:

the definition of the zone in terms of the $T_1, T_2, \ldots T_N$, the thermal models needed for any of the $T_i$, the f(x) or other definition of $T_{rep}$ in terms of $T_i$, the zone-specific constraints, and the thermal management decisions together with their affected power consuming activity limits (as part of the thermal control process software).

When the thermal control process in the device 2 runs in-the-field, it gathers temperature data or obtains temperature readings from the embedded sensors (sensor that are integrated in the device at the time of manufacture of the device.) It then plugs this data into the stored models of any virtual temperatures that are needed for the points of a given zone. In other words, the thermal control process analyzes the obtained temperature readings, to compute the virtual temperatures. The control process then analyzes the virtual temperatures, together with any direct or actual temperature reading for any point at which there is an embedded sensor, to calculate $T_{rep}$ (in this example, as the average of the point temperatures.) In then compares $T_{rep}$ to the stored constraints for this zone (i.e., determines whether $T_{rep}$ is greater than or less than a predefined threshold), based on which or in response to which it will take an action that affects thermal generation in the device (e.g., making one or more decisions on various power consuming activity limits that are expected to prevent $T_{rep}$ from going outside its constraint, or that bring $T_{rep}$ back within its constraint.)

Note that as part of a closed loop thermal control process, the above described operations are repeated by the thermal manager 30, for instance at a predetermined frequency, during in-the-field use of the device 2 so as to regulate the representative temperature, e.g., continuously while the device 2 is not in sleep mode. The thermal manager 30 may reduce the performance (or performance capability) of the device 2 when the computed representative temperature rises above a predetermined threshold, and increase the performance (or allow the performance capability to increase) when the computed representative temperatures drops below the threshold.

Deriving a Thermal Model for a Virtual Temperature at a Critical Point

A process flow diagram or algorithm for computing a thermal model 34 (see FIG. 2) of a critical point (where there is no embedded sensor) is now given. The process may be performed during manufacturing or laboratory testing, prior to releasing the thermal manager 30 and estimator 33 as part of a new specimen of the mobile device 2, or as a firmware upgrade for previously sold specimens of the device 2. Operation begins with temperature data from multiple, integrated or embedded sensors in the system being recorded (e.g., sensors K, L, etc. depicted in FIG. 2), at the same time as data from a testing or external sensor (e.g., a thermocouple) that is placed at the target critical point is also recorded. This recording of temperature data is performed while various power consumption states in the device 2 are exercised or a predetermined power consumption or activity pattern is forced (e.g., performing a wireless call for several minutes, and then once the call is finished pausing for a minute and then launching an email application and then closing the email application, and then on to a relatively long video game session, and so on).

Operation may then proceed with computing the temperature model for the DesiredTemp, by computing best-fit curves for the recorded data from the testing sensor, in view of the recorded data from the integrated sensors. Here, an approach that is essentially identical to that described in Our Earlier Application can be taken. That approach is now summarized here, although it should be noted that other ways of computing the temperature model are possible.

First, it is recognized that the recorded temperature data needs to be segregated into a steady state portion and a transient portion. In other words, the steady state response at the target point is modeled separately than the transient response, and then the two models are merged to generate a final thermal model—the final model can estimate an instantaneous temperature at the target point, based on having processed several sensor temperature data sequences.

Regression analysis may be used for modeling temperature data in this case, where the dependent variable in the regression equation is modeled as a function of several independent variables. However, the regression analysis should only be used for the steady state portion of the response, because the steady state temperature of the target point does not vary much as a function of time. A multivariate linear regression equation for DesiredTemp can be generated, viz.

$$\text{predictedDesiredTemp}=\beta_0+\beta_1*\text{sensor1}+\beta_2*\text{sensor2}+ \quad (3)$$

On the other hand, the transient portion of the response may be modeled using the technique described in Our Earlier Application referred to as the "three frequencies analysis" or filtering algorithm, to estimate a best-fit curve to the transient response data that has been collected. A mixture of exponentials may be used to generate the filter coefficients for each sensor, viz. operation (4)

$$\text{Sensor1\_filter}=\alpha_1*\text{sensor1\_freq1}+\alpha_2*\text{sensor1\_freq2}+\alpha_3*\text{sensor1\_freq3}+$$

$$\text{Sensor2\_filter}=\alpha_1*\text{sensor2\_freq1}+\alpha_2*\text{sensor2\_freq2}+\alpha_3*\text{sensor2\_freq3}+$$

The two approximations are then combined to generate a complete thermal model of the temperature at the target point, where this model then allows the temperature to be estimated at any time instant (based on input temperature sequences from the various embedded sensors in real-time). The two predictors may be merged as follows.

$$\text{predictedDesiredTemp}=\beta_0+\beta_1*\text{sensor1\_filter}+\beta_2*\text{sensor2\_filter}+\beta_3*\text{sensor3\_filter}+ \quad (5)$$

Operations (3), (4) and (5) are described in detail in Our Previous Application. The temperature model thus computed is then stored in a memory of each specimen of the device 2 that will be, or is already, placed into in-the-field use (by the end user.)

Detailed Block Diagram of an Example Computing System

Figure 4:
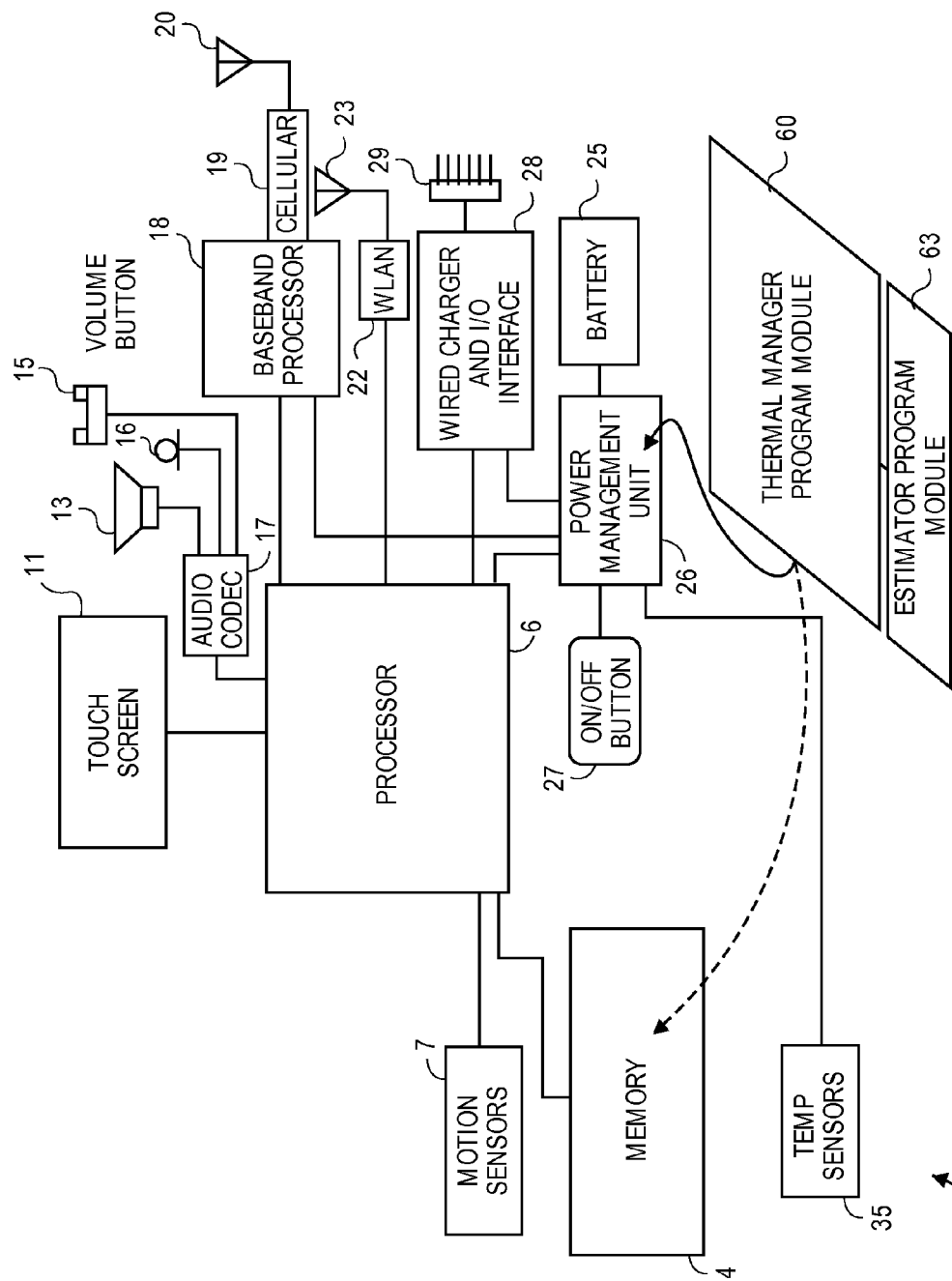
FIG. 4 is a block diagram of the functional unit blocks and hardware components in an example computing system.

FIG. 4 shows a functional unit block diagram and some constituent hardware components of a personal mobile device 2, e.g. as found in an iPhone™ device by Apple Inc. Although not shown, the device 2 has an exterior housing in which the components depicted in FIG. 4 can be integrated or embedded. The housing may be essentially a solid volume referred to as a candy bar or chocolate bar types as in the iPhone™ device. An alternative is one that has a moveable, multi-piece housing, such as a clamshell design, or one with a sliding, physical keypad as used by other cellular and mobile handset or smart phone manufacturers. The housing encases a primary mechanism for visual and tactile interaction with the user, namely a touch sensitive display screen (referred to here as a touch screen) 11. The touch screen 11 is used to display typical features of visual voicemail, web browser, email, and digital camera viewfinder, as well as others, and to receive input from the user via virtual buttons and touch commands. An alternative may be to have a display-only screen, with a separate keypad or keyboard or other tactile input device.

For wireless telephony, which enables the user to receive and place audio and/or video calls, downlink audio during a call can be emitted from a speaker 13 (which may be an earpiece speaker or receiver, or it may be a headset earphone). Uplink audio includes the user's speech, which is picked up by a microphone 16 (e.g., mouthpiece microphone or headset microphone). Conversion between analog domain and digital domain for the speaker and microphone signals, in addition to digital audio signal processing for different applications running in the device 2, may be performed within audio codec 17. A physical volume switch or button 15 may also be connected to the codec. The codec 17 may be configured to operate in different modes, e.g. to service a digital media player function (such as an MP3 player that is playing back a music file that is stored in the device 2), as well as a wireless telephony function.

For wireless telephony, a baseband processor 18 is included to perform speech coding and decoding functions upon the uplink and downlink signals, respectively, in accordance with the specifications of a given protocol, e.g. cellular GSM, cellular CDMA, wireless VoIP. A cellular transceiver 19 receives the coded uplink signal from the baseband processor and up converts it to a carrier band before driving an antenna 20 with it; it receives a downlink signal from the antenna 20 and down converts the signal to baseband before passing it to the baseband processor 18. A wireless local area network transceiver 22 receives and transmits data packets from a nearby wireless router or access point, using an antenna 23.

Power is provided to operate the components shown in FIG. 4 by a battery 25 (generically used here to refer to a rechargeable power source that may also include a rechargeable fuel cell). The battery 25 is charged or replenished by an external power source such as a wall plug or automobile battery dc power adapter (not shown) that connects to a multi-pin docking connector 29 that is also integrated in the housing of the device 2. The connector 29 and its associated charger and I/O interface circuitry 28 may be in accordance with any suitable computer peripheral specification such as Universal Serial Bus (USB). The USB protocol allows for the connector 29 and its associated interface 28 to be used for both power transfer to recharge the battery 25 and for data I/O communications. The latter includes docking functions, to synchronize user content in the device 2 with another computer device owned by the user that may have substantially more data storage capacity, e.g. a desktop computer, a laptop/notebook computer.

The user-level functions of the device 2 are implemented under control of a processor 6 that has been programmed in accordance with instructions (code and data) stored in memory 4. The processor 6 and memory 4 are generically used here to refer any suitable combination of programmable data processing components and data storage that conduct the operations needed to implement the various functions of the device. The processor 6 may be an applications processor typically found in a smart phone, while the memory 4 may refer to microelectronic, non-volatile random access memory. An operating system may be stored in the memory 4, along with application programs specific to the various functions of the device, which are to be run or executed by the processor 6 to perform the various functions of the device 2. For instance, there may be a telephony application that (when launched, unsuspended, or brought to foreground) enables the user to "dial" a telephone number to initiate a telephone call using wireless VoIP or a cellular protocol and to "hang up" on the call when finished.

The device 2 presents a particularly challenging task for dissipating sufficient heat that is produced as a result of the various functions running inside its housing. As described above, a thermal management or thermal control process is needed to make sure that critical temperature zones inside and, especially, on the outside surface of the housing do not exceed their maximum constraints or specifications, while maintaining as much performance in the device 2 as possible. For this purpose, a power management unit 26 may be included which is typically implemented as a programmed processor with associated analog and digital conversion circuitry, analog signal conditioning circuitry, and a data communications interface such as I2C needed to control or communicate with other components of the device (for purposes of thermal management). The PMU 26 obtains temperature data (or temperature readings) from multiple sensors 35, as well as power data (which may be sensed or estimated power consumptions of certain power hungry components such as the processor 6). The PMU 26 then processes that data to make decisions that effect power consumption activity, in order to maintain a given critical zone within a predetermined constraint. A thermal manager program module 60 may be stored in memory of the power management unit 26, or alternatively in the main memory 4, which specially programs a processor of the PMU 26 (or the processor 6) to perform the functions described above in connection with the thermal manager 30 in FIG. 2. Similarly, an estimator program module 63 may also be stored in memory, where that module programs a processor to perform the functions described above for the estimator 33, namely computing the estimated temperature at one or more selected target critical points at which there are no temperature sensors available.

The power management unit 26 can perform a method, for controlling the thermal behavior of a computing system being the device 2, as follows:

1) A predefined mathematical relationship that is stored in the memory of the system is accessed; this relationship refers to temperatures of several distinct or spaced-apart points, respectively, in the system, wherein the points together define a zone of the system; the mathematical relationship provides a single representative temperature for the zone; the mathematical relationship may be defined by $$T_{rep} = \Sigma_{i=1}^{N} f(x)_i T_i$$

where $T_{rep}$ is the representative temperature, $T_i$ is a temperature of the $i^{th}$ point and $f(x)_i$ is a weighting function for the temperature of the $i^{th}$ point; the weighting function may be an averaging function that takes an average or mean of a plurality of temperatures $T_1, T_2, \ldots T_N$ (while noting that other weighting functions are of course possible);

The zone may be an outside surface of a housing of the system where the user touches the system; the zone has an area greater than the footprint of any one of the sensors; for instance, the zone can have dimensions approximately equal to a touch sensory resolution of a user of the system;

2) One or more thermal models that are stored in the memory are accessed, wherein each of the thermal models estimates the temperature of a respective one of the points that define the zone, based on temperature data from the sensors;

3) Temperature data is obtained from the sensors and then, using the thermal models, the temperatures of the points that define the zone are estimated;

4) The representative temperature for the zone is computed using the estimated temperatures of the points as input to the mathematical relationship;

5) A decision is made on whether or not to change a power consuming activity limit in the system, based on the computed representative temperature; In one embodiment, the decision is made further based on power consumption data that has been received for one or more components in the system (e.g., the current level of CPU power consumption); the power consuming activity limit can be selected from the group consisting of, for instance, the speed of a cooling fan including whether the fan is on or off, a power supply voltage of a data processing unit, maximum transmit power of an RF antenna, clock speed of a data processing unit, whether a data processing unit is enabled or disabled, and intensity of a light source including whether the light source is on or off.

It should be noted that the above-described thermal control method can alternatively be performed by the processor 6 when suitably programmed in accordance with executable instructions contained in the memory 4.

It will be apparent from this description that aspects of the present invention may be embodied, at least in part, in software, hardware, firmware, or in combination thereof. That is, the techniques may be carried out in a computer system or other data processing system in response to its processor, such as a microprocessor, executing sequences of instructions contained in a machine-readable medium e.g., memory, such as ROM, volatile RAM, non-volatile memory, cache, or a remote storage device. A machine-readable medium can be used to store software and data which when executed by the data processing system causes the system to perform various methods of the present invention. This executable software and data may be stored in various places including for example ROM, volatile RAM, non-volatile memory, and/or cache. Portions of this software and/or data may be stored in any one of these storage devices.

In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize that what is meant by such expressions is that the functions result from execution of code by a processor, such as a microprocessor.

Throughout the foregoing specification, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to bring about such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and in the claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the Detailed Description as set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention may include various operations as set forth above, or fewer operations, or more operations, or operations in an order, which is different from the order described herein. The operations may be embodied in machine-executable instructions, which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims, which follow as well as the legal equivalents thereof.

What is claimed is:

1. A method for controlling the thermal behavior of a computing system having a plurality of embedded temperature sensors, comprising:
    accessing a predefined mathematical relationship that is stored in a memory of the system, wherein the relationship refers to temperatures of a plurality of spaced-apart points, respectively, in the system, wherein the points together define a zone of the system, the mathematical relationship to provide a representative temperature for said zone;
    accessing a plurality of thermal models that are stored in the memory, wherein each of the thermal models estimates the temperature of a respective one of the plurality of points that define the zone, based on temperature data from the sensors;

obtaining temperature data from the sensors and estimating, using the thermal models, the temperatures of the plurality of points that define the zone;

computing the representative temperature for said zone using the estimated temperatures of the plurality of points as input to the mathematical relationship; and making a decision on whether or not to change a power consuming activity limit in the system, based on the computed representative temperature, wherein the power consuming activity limit is one of:

the speed of a cooling fan including whether the fan is on or off;

a power supply voltage of a data processing unit;

maximum transmit power of an RF antenna;

clock speed of a data processing unit;

whether a data processing unit is enabled or disabled; or intensity of a light source including whether the light source is on or off.

2. The method of claim 1 wherein the zone is an outside surface of a housing of the system where the user touches the system, the zone having an area greater than a footprint of any one of the sensors.

3. The method of claim 1 further comprising receiving power consumption data for a component in the system, wherein the decision on the power consuming activity limit is made further based on the power consumption data.

4. The method of claim 1 wherein the mathematical relationship is defined by:

$$T_{rep} = \Sigma_{i=1}^{N} f(x)_i T_i$$

where $T_{rep}$ is the representative temperature, $T_i$ is a temperature of the $i^{th}$ point and $f(x)_i$ is a weighting function for the temperature of the point.

5. The method of claim 4 wherein the weighting function is an averaging function that takes an average or mean of a plurality of temperatures $T_1, T_2, \ldots T_N$.

6. The method of claim 1 wherein the zone has dimensions approximately equal to a touch sensory resolution of a user of the system.

7. An article of manufacture comprising:

a machine-readable medium storing executable instructions which program a processor of a portable electronic device to control the thermal behavior of the device so as to regulate a representative temperature of the device, wherein the programmed processor is to a) obtain temperature readings from a plurality of temperature sensors that are integrated within the portable electronic device, b) analyze the obtained temperature readings to compute a plurality of virtual temperatures each being an estimate of the temperature at a different spot on an outside surface of an exterior housing of the portable electronic device at which spot there is no temperature sensor, c) analyze the plurality of virtual temperatures to compute the representative temperature, and d) take an action that affects thermal generation in the portable electronic device in response to the computed representative temperature being greater than or less than a predefined threshold.

8. The article of manufacture of claim 7 wherein the medium stores instructions which program the processor to repeat the operations in a)-d) a plurality of times during in-the-field use of the device so as to regulate the representative temperature.

9. The article of manufacture of claim 8 wherein the medium stores instructions which program the processor to regulate the computed, representative temperature by preventing the representative temperature from exceeding the predefined threshold through actions taken to reduce thermal generation in the device.

10. The article of manufacture of claim 7 wherein the medium stores instructions which program the processor to reduce performance of the device when the computed representative temperature is greater than the predefined threshold, and to increase the performance when the computed representative temperature is less than the predefined threshold.

11. The article of manufacture of claim 7 wherein the medium stores further instructions which program the processor to compute the representative temperature by also analyzing a temperature reading obtained from a temperature sensor in the portable electronic device.

12. A computing system comprising:

a thermal manager to perform a closed loop thermal control process that regulates a computed representative temperature of the system by changing power consuming activity limits in the system that affect heat buildup in the system, so as to maintain the representative temperature within a predefined constraint during in-the-field use of the system, wherein the thermal manager is to compute the representative temperature using a stored mathematical relationship that defines the representative temperature as a weighted sum of temperatures of a plurality of points in the system, compare the computed representative temperature to a stored constraint and based on the comparison determine whether or not to change one of the power consuming activity limits in the system;

a plurality of temperature sensors that are not located at any of the plurality of points; and an estimator to compute one of the temperatures of the plurality of points using a stored thermal model with temperature data from the plurality of sensors as input to the thermal model.

13. The computing system of claim 12 further comprising:

a temperature sensor that is located at one of the plurality of points so as to provide the thermal manager with the temperature of said one of the plurality of points.

14. The computing system of claim 12 further comprising:

an exterior housing in which the thermal manager, the temperature sensors, and the estimator are integrated, wherein the plurality of points are located on the outside surface of the exterior housing.

15. The computing system of claim 14 wherein the plurality of temperature sensors are located inside the exterior housing.

16. The computing system of claim 15 wherein the plurality of points define a zone on the outside surface of the exterior housing whose dimensions are approximately equal to a touch sensory resolution of a human being.

* * * * *